US011381662B2

(12) United States Patent
Schukovets et al.

(10) Patent No.: US 11,381,662 B2
(45) Date of Patent: Jul. 5, 2022

(54) TRANSITION OF BUSINESS-OBJECT BASED APPLICATION ARCHITECTURE VIA DYNAMIC FEATURE CHECK

(71) Applicant: SAP SE, Walldorf (DE)

(72) Inventors: Igor Schukovets, Mannheim (DE); Oliver Thomas Niedermaier, Heidelberg (DE); Olaf Kellmereit, Walldorf (DE); Bernd Kauerauf, Heidelberg (DE); Christoph Mayer, Lobbach (DE); Thomas Juergensen, Neckargemund (DE); Kevin Drieschner, Walldorf (DE); Gregor Tielsch, Mannheim (DE); Erich Schulzke, Heidelberg (DE)

(73) Assignee: SAP SE, Walldorf (DE)

( * ) Notice: Subject to any disclaimer, the term of this patent is extended or adjusted under 35 U.S.C. 154(b) by 502 days.

(21) Appl. No.: 14/980,251

(22) Filed: Dec. 28, 2015

(65) Prior Publication Data
US 2017/0187834 A1 Jun. 29, 2017

(51) Int. Cl.
*H04L 67/00* (2022.01)
*H04L 67/10* (2022.01)
*G06F 8/76* (2018.01)
*G06Q 30/06* (2012.01)
*H04L 67/02* (2022.01)

(52) U.S. Cl.
CPC ............... *H04L 67/34* (2013.01); *G06F 8/76* (2013.01); *H04L 67/10* (2013.01); *G06Q 30/0601* (2013.01); *H04L 67/02* (2013.01)

(58) Field of Classification Search
CPC ......... H04L 67/34; H04L 67/10; H04L 67/02; G06Q 30/0601; G06F 8/76
See application file for complete search history.

(56) References Cited

U.S. PATENT DOCUMENTS

| 9,270,743 | B2 * | 2/2016 | Frenkel | H04L 67/10 |
| 2002/0083212 | A1 * | 6/2002 | Salmon | G06F 9/44521 719/313 |
| 2002/0094069 | A1 * | 7/2002 | Takahashi | H04M 1/72 379/93.17 |
| 2004/0025143 | A1 * | 2/2004 | Bhogal | G06F 8/75 717/115 |

(Continued)

*Primary Examiner* — Javier O Guzman
(74) *Attorney, Agent, or Firm* — Buckley, Maschoff & Talwalkar LLC (57) ABSTRACT

A method, system, and computer-readable medium, including receiving a request to process a business object including an indication of at least one feature that can be invoked in the processing of the business object; determining the at least one feature associated with the business object based on the indication thereof included with the business object; determining whether the at least one feature associated with the business object can be executed by a second application based on an indication of a set of features supported by the second application; processing, in response to a determination that the at least one feature can be executed by the second application, the business object by the second application; and processing, in response to a determination that the at least one feature is not supported by the second application, the business object by a first application that supports a first set of features.

20 Claims, 7 Drawing Sheets

(56) References Cited

U.S. PATENT DOCUMENTS

| | | | |
|---|---|---|---|
| 2004/0268371 A1* | 12/2004 | Carrell | G06F 9/541 |
| | | | 719/330 |
| 2008/0082535 A1* | 4/2008 | Eigemann | G06F 8/38 |
| 2009/0293004 A1* | 11/2009 | Emam | G06F 3/0481 |
| | | | 715/762 |
| 2010/0332629 A1* | 12/2010 | Cotugno | G06F 9/5072 |
| | | | 709/221 |
| 2012/0102103 A1* | 4/2012 | Jacobson | G06F 9/45533 |
| | | | 709/204 |
| 2012/0109661 A1* | 5/2012 | Lueckhoff | G06Q 10/10 |
| | | | 705/1.1 |
| 2013/0047139 A1* | 2/2013 | Bolton | G06F 8/71 |
| | | | 717/121 |
| 2013/0110547 A1* | 5/2013 | Englund | G16H 10/60 |
| | | | 705/3 |
| 2014/0040182 A1* | 2/2014 | Gilder | G06F 17/2264 |
| | | | 707/602 |
| 2014/0047459 A1* | 2/2014 | Kauerauf | G06F 9/548 |
| | | | 719/316 |
| 2014/0089379 A1* | 3/2014 | Davis | G06F 8/31 |
| | | | 709/203 |
| 2014/0164479 A1* | 6/2014 | Vano Newman | H04L 67/02 |
| | | | 709/203 |
| 2014/0222756 A1* | 8/2014 | Schmidt | G06F 16/86 |
| | | | 707/610 |
| 2014/0270258 A1* | 9/2014 | Wang | G06F 3/167 |
| | | | 381/110 |
| 2015/0074278 A1* | 3/2015 | Maes | H04L 67/10 |
| | | | 709/226 |
| 2015/0169291 A1* | 6/2015 | Dube | G06F 8/20 |
| | | | 717/101 |
| 2015/0263894 A1* | 9/2015 | Kasturi | G06F 9/4856 |
| | | | 709/222 |
| 2015/0298544 A1* | 10/2015 | Amerla | B60K 17/344 |
| | | | 74/405 |
| 2016/0034277 A1* | 2/2016 | Syed | G06F 8/76 |
| | | | 717/136 |
| 2016/0077881 A1* | 3/2016 | Anderson | G06F 9/5011 |
| | | | 718/104 |
| 2016/0261684 A1* | 9/2016 | Khalaf | H04L 67/1002 |
| 2017/0024396 A1* | 1/2017 | Adarsh | H04L 67/10 |
| 2017/0116343 A1* | 4/2017 | Wu | G06F 16/256 |

* cited by examiner

FIG. 1

Feature Matrix of WebGUI app (whole scope) — 105
- Core functionality
- Single Account Assignment
- Basic Partner Management
- Attachments — 110
- Longtexts
- Schedule Lines
- Multi Account Assignment
- Extended Partner Management
- Batch Number Management
- ... — 115

Feature Matrix of particular purchasing document (random scope) — 125
- Core functionality
- Single Account Assignment
- Core Partner Management
- Attachments — 130
- Features not supported by FIORI app — 135

Feature Matrix of FIORI app (viable scope) — 120
- Core functionality
- Single Account Assignment
- Basic Partner Management
- Attachments — 110

TRANSITION OF BUSINESS-OBJECT BASED APPLICATION ARCHITECTURE VIA DYNAMIC FEATURE CHECK

Increasingly, the market of enterprise software is moving towards using software as a service (cloud-based) and using mobile devices to access the enterprise data associated therewith. Concurrently, customers of the enterprise software cannot move their critical enterprise data and processes to the cloud because, in many instances, the cloud-based software is missing some functionality and features.

DETAILED DESCRIPTION

Some embodiments herein are associated with methods and systems for transitioning or migrating from one software application, service or architecture to a second software application, service or architecture that is different than the first. In some embodiments, the first application or architecture (also simply referred to herein as an "application") may be on-premise, legacy enterprise software and the second software application (also referred to herein as the "second application") may include a cloud-based architecture where the second application is configured as software as a service (SaaS). A developer of the first application may develop the second application to, for example, add enhancements to the functionality of the software. In some aspects, all of the features of the first application as implemented and deployed on the first architecture may not be included in the second application as initially implemented and deployed.

However, end-users of the first application may be accustomed to and rely on the different features of the first application to perform, for example, a variety of business critical processes. The present disclosure relates to methods, systems, and tangible media including executable program instructions thereon to dynamically execute all the features of a software application being transitioned from a first architecture to a second architecture, without losing functionality related to the different features in an efficient manner. In some aspects, the first application may be a legacy system relied upon by a business or other organization for functions vital to the on-going operations of the business or organization.

Additionally, business processes may logically be represented as abstractions referred to herein as a "business object". As used herein, a business object (BO) is a data structure defined during a design-time. For example, a BO "material" may have fields with attributes such as "vendor", "price", "unit to indicate a quantity", etc. and a "Purchase Order" BO may have, for example, fields with attributes such as "ID", "vendor", "quantity of material", "delivery time frame", etc. that correspond to all of the characteristics of a purchase order used by a business or organization in the generation and managing of purchase orders. A description of the attribute fields is expressed in metadata associated with the BO. A BO also refers to a particular data set as defined by or according to the data structure and is used during a run-time of applications making calls to the BO. That is, a BO can refer to an instance (instantiation) of the BO data structure. An example of an instance of a Purchase Order BO can be a purchase order document sent to a business entity having a particular ID number, quantities, time frame for delivery, etc.

Some aspects of the present disclosure will be presented in the context of an example execution of an application on an architecture including a new user interface (UI) paradigm. In particular, the UI paradigm in the example is a HTML5 (HyperText Markup Language, version 5) browser-based UI. The example application is a "Manage Purchase Order" application and may be referred to as the "second" application for sake of clarity in the following discussion. The new UI architecture may be contrasted with an existing legacy graphical UI paradigm architecture that supports a full range of features implemented by a "first application" to manage processes related to purchase orders. In some instances herein, the "first application" and the "second application" may refer to specific applications as well as to the architectures on which the applications run.

Figure 1:
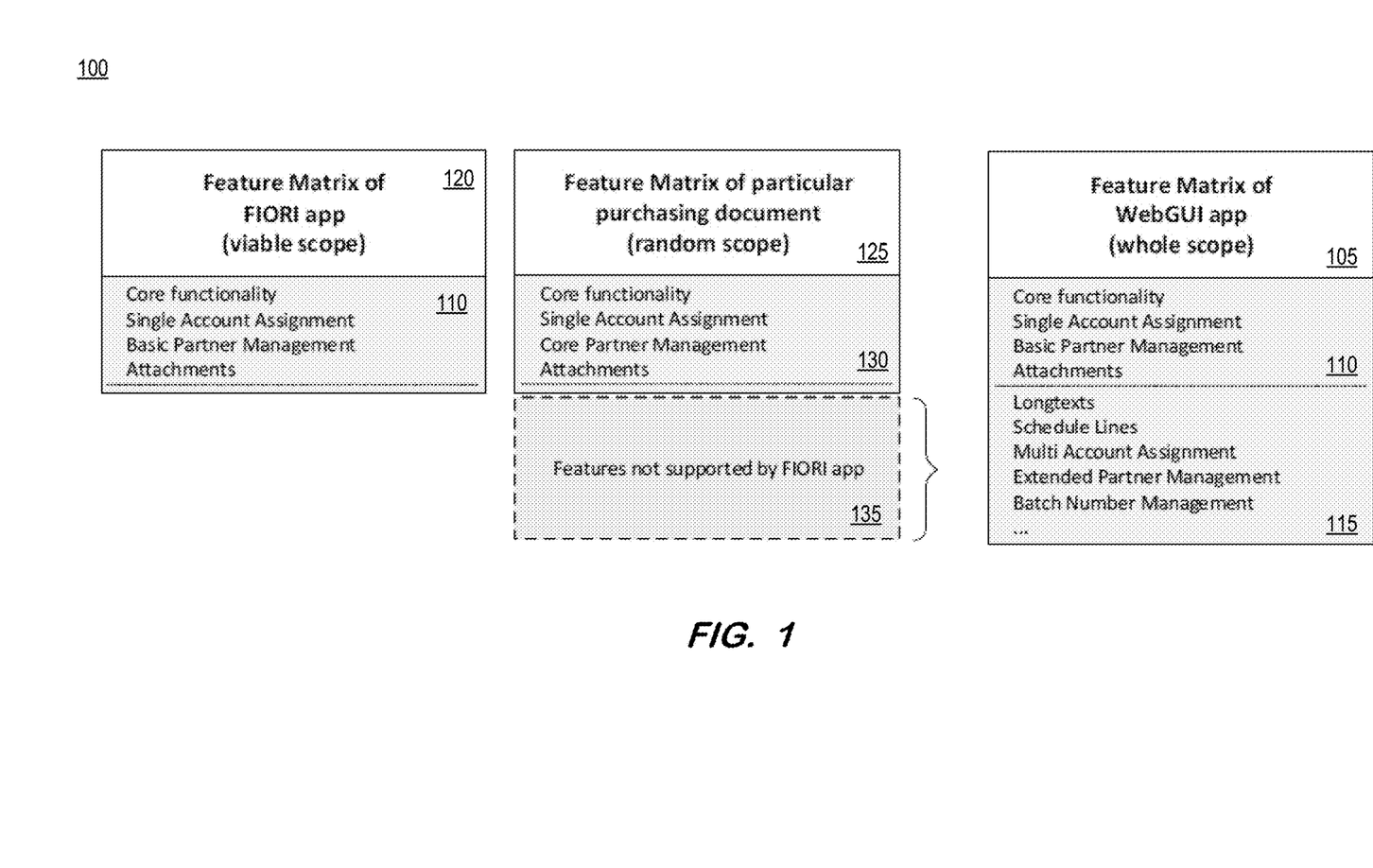
FIG. 1 is an illustrative depiction of feature sets, in accordance with some embodiments herein.

FIG. 1 is an illustrative depiction 100 of an example of different feature sets related to a first application 105 (e.g., legacy enterprise software/legacy architecture) and a second application 120 (e.g., a cloud-based application/architecture). The totality of the features of first application 105 includes features 110 and 115. The combined features 110 and 115 represent the total scope of the features and functionality of the first application. FIG. 1 also illustrates a set of features 110 provided or supported by second application 120 at a given point in time (e.g., an initial deployment of the second application). It is noted that the set of features 110 supported by the second application are a subset of the total scope of features supported by first application 105.

In some regards, all of the features within the whole scope of the first application may not be supported by the second application at the time the second application is developed and deployed and/or for some other time thereafter in various versions of the second application to different extents. However, the second application may support, for example, at least some of the key features valued by end-users of the first and second applications, including features critical to their business or organization.

A feature matrix of first application 105 includes the whole scope of the features 110 and 115 supported by the legacy architecture, whereas a feature matrix of second application 120 includes a subset of the feature set supported by the second application, namely features 110. FIG. 1 further illustrates a feature matrix including the features (e.g., methods) associated with an instance of a particular BO 125. In the present example, BO 125 is a specific instantiation of a particular purchasing document having a certain scope of associated features 130. As seen in FIG. 1, the features 130 associated with BO 125 align with and correspond to the features 110 supported by second application 120. Since the features 130 associated with BO 125 align with and correspond to the features 110 supported by second application 120, BO 125 may be processed by the (new) second application without any loss of functionality associated with the BO. In some instances however, BO 125 may include at least some features 135 (not specified in the example of FIG. 1) that do not correspond with the features 110 supported by second application 120. In this case, BO 125 may need to be processed by first application 105 to ensure that there is no loss of functionality associated with the BO since the features 135 are supported by first application 120 because the first application supports all possible (i.e., permissible) features as specified in feature sets 110 and 115.

Figure 2:
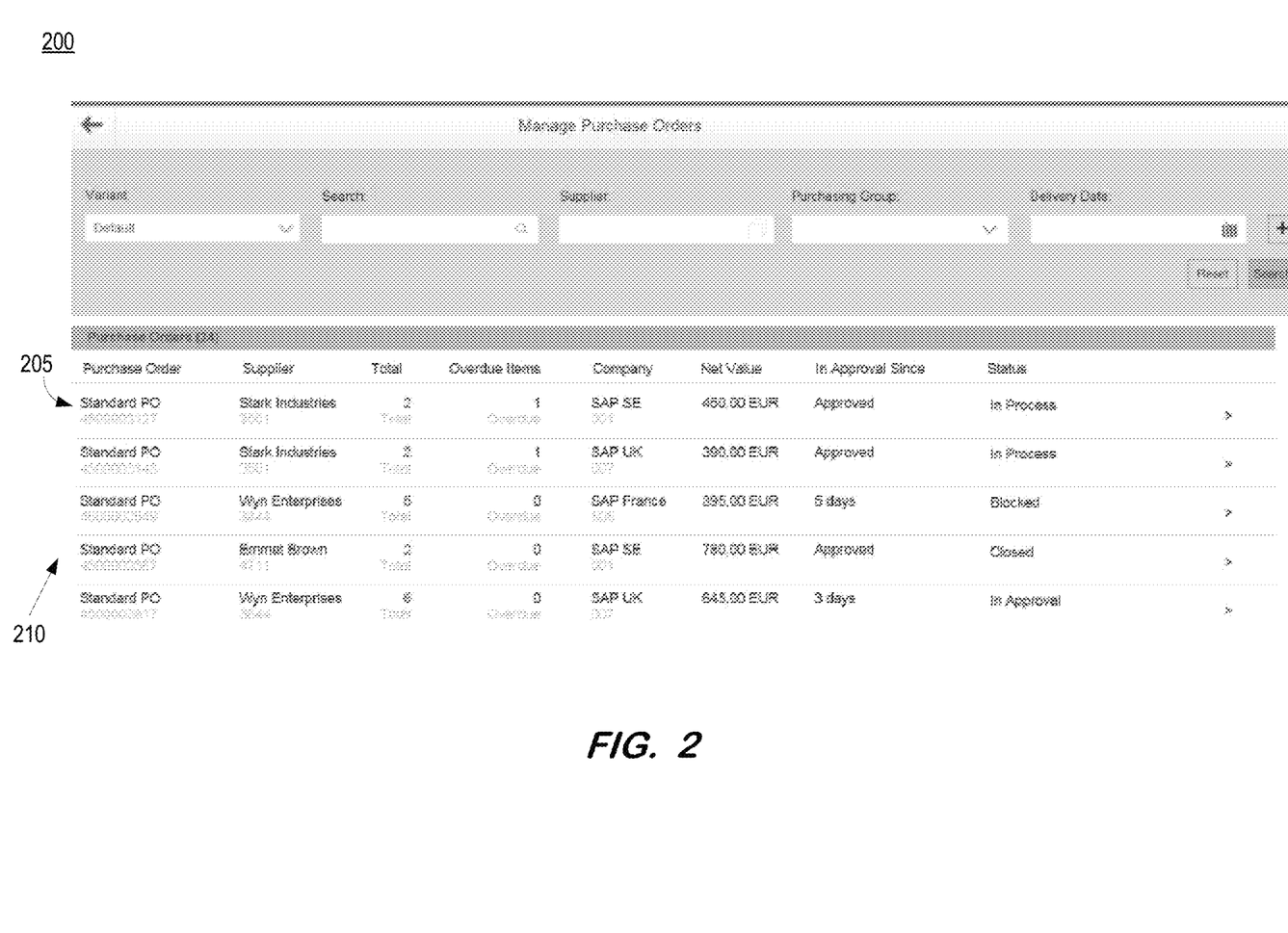
FIG. 2 is an illustrative depiction of a list of business object representations, in accordance with some embodiments herein.

FIG. 2 is an illustrative depiction of an outward view 200 of a UI, in accordance with some embodiments herein. UI view 200 includes a listing of a plurality of purchase orders at 210 (e.g., a "Worklist") that may be available for processing by a "Managing Purchase Orders" application. Each of the purchase orders at 210 may be graphical representations of a particular instance of a Purchase Order BO, including, for example, PO 205.

Figure 3:
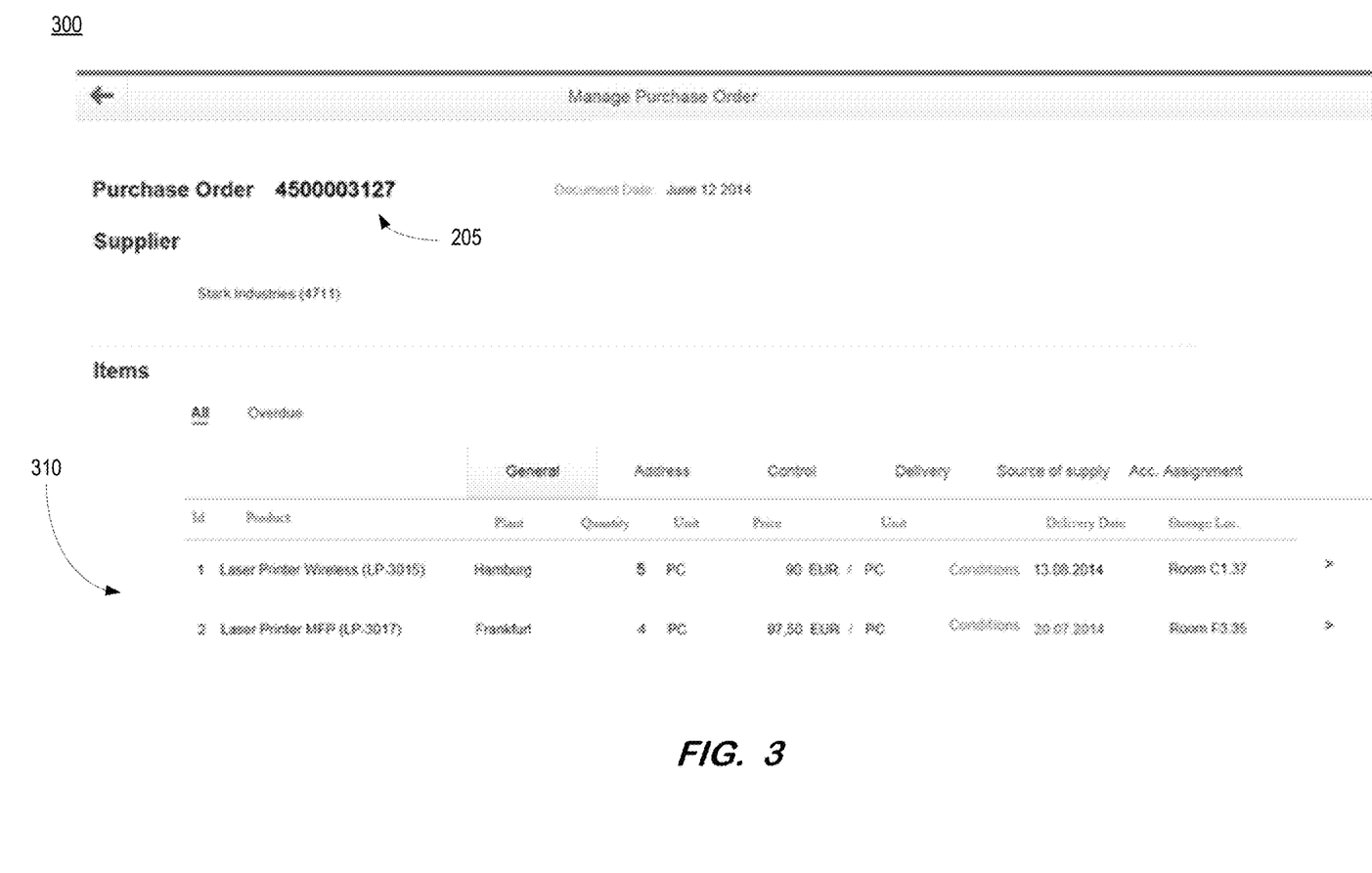
FIG. 3 is an illustrative depiction of a selected business object representation, in accordance with some embodiments herein.

FIG. 3 is an illustrative depiction of an outward view 300 of a UI, in accordance with some embodiments herein. UI view 300 includes the details 310 of a specific purchase order, PO 205, selected from the listing of purchase orders in UI 200 by a user. In some embodiments, FIG. 3 may be referred to as an "Object Page" that includes a listing of the details associated with a specific BO.

In some embodiments, an act of selecting a BO (e.g., PO 205) from the "Worklist" of FIG. 2 can invoke an execution of an application to process the selected BO (e.g., PO 205), as illustrated in FIG. 3. In some embodiments herein, a request or command to process a BO can initiate a process to determine whether the BO can be processed by a second application (e.g., newer (preferred) cloud-based application/architecture), or whether the BO needs to be process by a first application (e.g., legacy application/architecture) to ensure all of the features associated with the BO are available during the processing of the selected BO.

Figure 4:
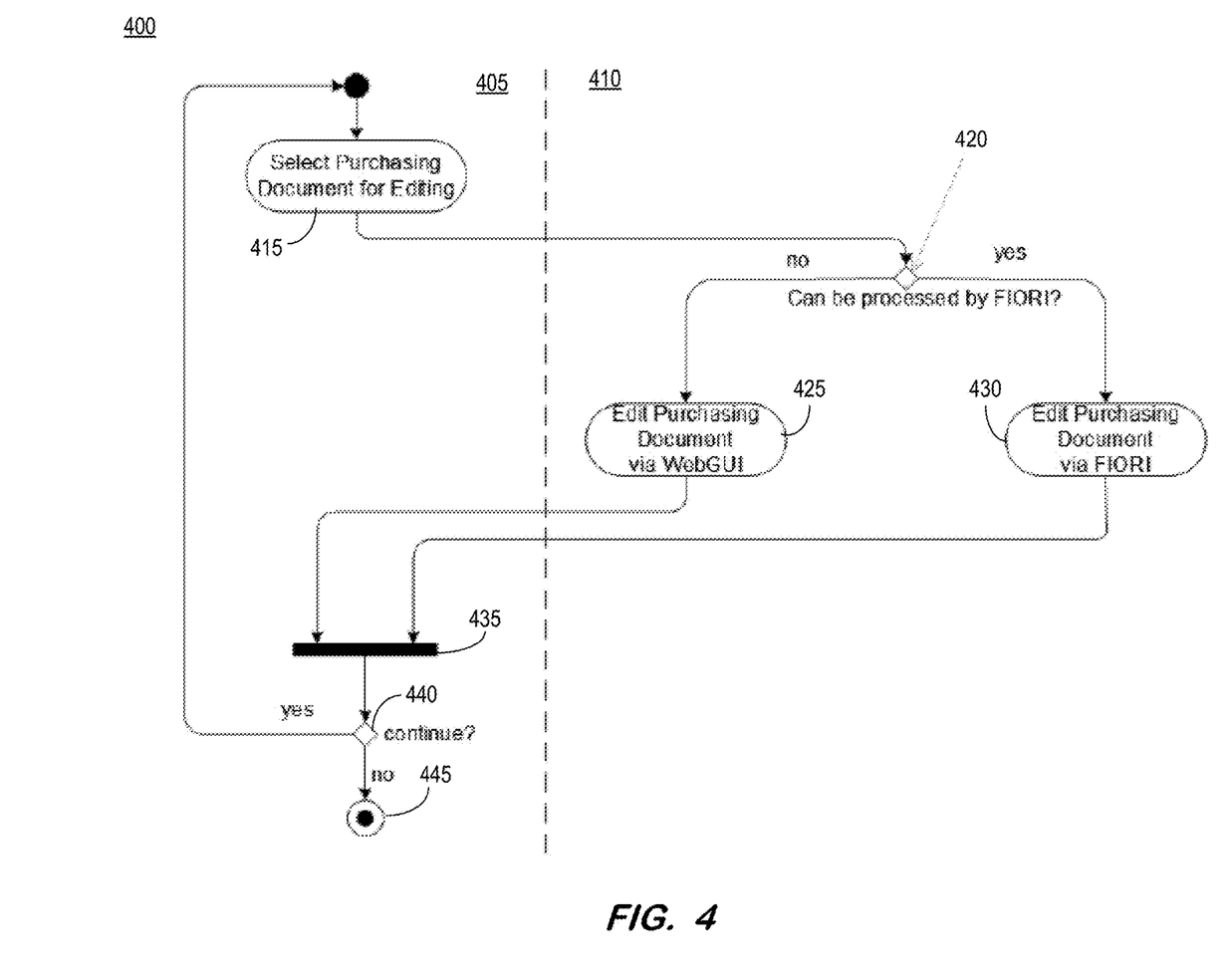
FIG. 4 is a logical flow diagram of a process, according to some embodiments.

FIG. 4 is a logical flow diagram of a process 400, according to some embodiments herein. FIG. 4 is generally divided into two sections, section 405 includes operations that may be performed via a first UI (e.g., UI 200 of FIG. 2 including a "Worklist") and section 410 including operations that may be invoked via a second UI (e.g., UI 300 of FIG. 3 including an "Object Page").

Process 400 is shown starting with an initial operation of 405. In some embodiments, one or more operations may occur before operation 405 that, at least in part, facilitate the execution of process 400. For example, one or more operations to define the features associated with and supported by an application/architecture herein can be accomplished by a developer or other entity before operation 405. The developer may operate to define and configure a specification, listing, or indication of the features associated with a first and second application/architecture as shown, for illustrative purposes, by the example of the feature sets/matrixes of FIG. 1. Additionally, the features associated with the BOs that may potentially be called or processed by the first and second applications/architectures in some embodiments herein may also be defined (e.g., during a design-time).

Process 400 is a continuation of the purchase order management example introduced earlier. Operation 405 includes selecting a particular purchasing document for the editing thereof. The particular purchasing documents is represented by a BO in the current example and can be selected from a listing of different BOs, including the subject PO document. The selected BO can be selected via a UI such as, for example, UI 200 of FIG. 2 including the "Worklist". The UI accessed for the selection operation 405 may be a UI associated with a second, cloud-based application/architecture.

In some aspects, an end-user interacting with the UI associated with the second, cloud-based application/architecture need not know or otherwise be concerned with whether the second, cloud-based application/architecture can support and/or deliver all of the features associated with the selected BO. In response to the selection of the BO (e.g., purchasing document) at operation 405, a system or process herein may automatically invoke one or more operations or a process 420 to determine whether the second, cloud-based application/architecture supports all of the features of the selected BO. At operation 520, referred to herein as a Dynamic feature Check (DFC), a determination is made whether the features associated with the selected BO are supported by the second, cloud-based application/architecture. The DFC is performed in response to the selection to process the selected BO (e.g., edit the particular purchasing document). In some embodiments, the DFC may be called from "Object Page" 410, as shown in FIG. 3.

In response to a determination performed at operation 420 that the feature(s) associated with the selected BO can be executed by the second application/architecture, the BO is processed at operation 430. The processing of the selected BO by the second application can include the editing of the selected BO via the second application/architecture. In the present example, the second application/architecture can include a cloud-based application or suite of applications sharing, at least, common UI characteristics.

In response to a determination performed at operation 420 that the feature(s) associated with the selected BO cannot fully be executed by the second application/architecture, the BO is processed by the first application/architecture at operation 425. The processing of the selected BO by the first application can include the editing of the selected BO via the first (i.e., legacy) application/architecture. In the present example, the first application/architecture can include a legacy application or suite of applications.

In some embodiments herein, the DFC determination(s) of operation 420 are performed or executed in response to a call to process the BO based on the features determined to be associated with the selected BO at the time the request to process the selected BO is received at operation 420. In this manner, the selected BO can be processed by the second application/architecture as features are implemented (e.g., "rolled out") in the second application/architecture. The DFC determination(s) of operation 420 may be performed on the individual BOs as the selected, individual BOs are processed. In some aspects, the DFC mechanisms herein allow and/or provide immediate adoption of a (new) architecture, with an assurance that functionality will not be lost from an end-users perspective.

In some embodiments, the features associated with a BO herein may be stored or otherwise indicated in one or more tables, fields, header(s), and as different values and/or flags in one or more tables, fields, and header(s). In some aspects, a BO herein is a hierarchical data structure having one or more nodes having associated fields and attributes, as well as associated metadata. The fields, attributes, and metadata of a BO may include the different one or more tables, fields, header(s) as different values and/or flags in the one or more tables, fields, and header(s) that can be configured to indicate the features associated with the BO. In some embodiments herein, the DFC of operation 420 may use one or more mechanisms (e.g., a summary table, individual tables, metadata values, etc.), without limit, as a basis to check or otherwise determine which features are associated with a BO.

Continuing with process 400, flow may return to the "Worklist" 405 at 435 after the selected BO is processed in accordance with the DFC determination(s) of operation 420. At operation 440, a determination may be made regarding whether a user wishes to continue processing of BOs listed in the "Worklist". If the user or other entity (e.g., another application or service) interacts with the "Worklist" to indicate further processing of BOs listed therein, then process 400 can return to operation 415. Otherwise, process 400 may terminate (or at least pause) at 445.

Figure 5:
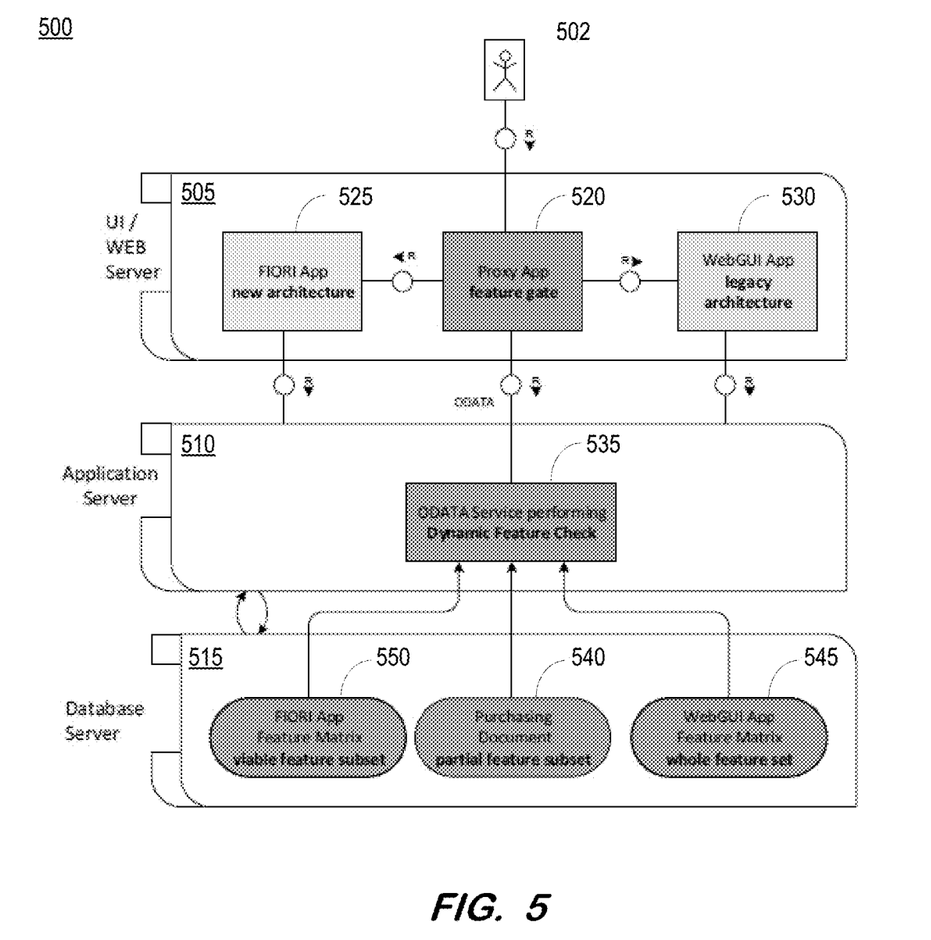
FIG. 5 is an illustrative depiction of a system to support a process, in accordance with some embodiments herein.

FIG. 5 is an illustrative depiction of a system or platform 500 to support processes and systems herein. System 500 generally includes a UI layer 505 that can receive user input from a user 502 (e.g., a UI/WEB server), a server layer 510 to receive requests from the UI layer and perform processing tasks, and a database layer 515 to perform database management tasks, including data persistence. In accordance with some of the other aspects discussed herein, UI layer includes UI components 530 and 525 associated with a first (i.e., legacy) application and a second (e.g., new cloud-based) application, respectively. Additionally, UI layer 505 includes a module 520 (e.g., a "proxy app feature gate") that may act as a gateway or controller to coordinate requests received from user 502 via either of the UIs 525 and 530.

Module 520 may forward or send the requests to process a BO as selected by user 502 via UI layer 505 to an application server of server layer 510. The application server may receive requests to process the BO by user 502 from UI layer 505 in the form of OData (Open Data Protocol), in some embodiments. The application server may operate to execute at least a portion of the processes disclosed herein, including but not limited to process 400 of FIG. 4. In furtherance of the processing by the application server of server layer 510, database layer 515 may store and manage a feature matrix associated with the first application/architecture 545, a feature matrix associated with the second application/architecture 525, and a feature matrix 540 associated with the BOs that can be called by the first and second applications/architectures.

Figure 6:
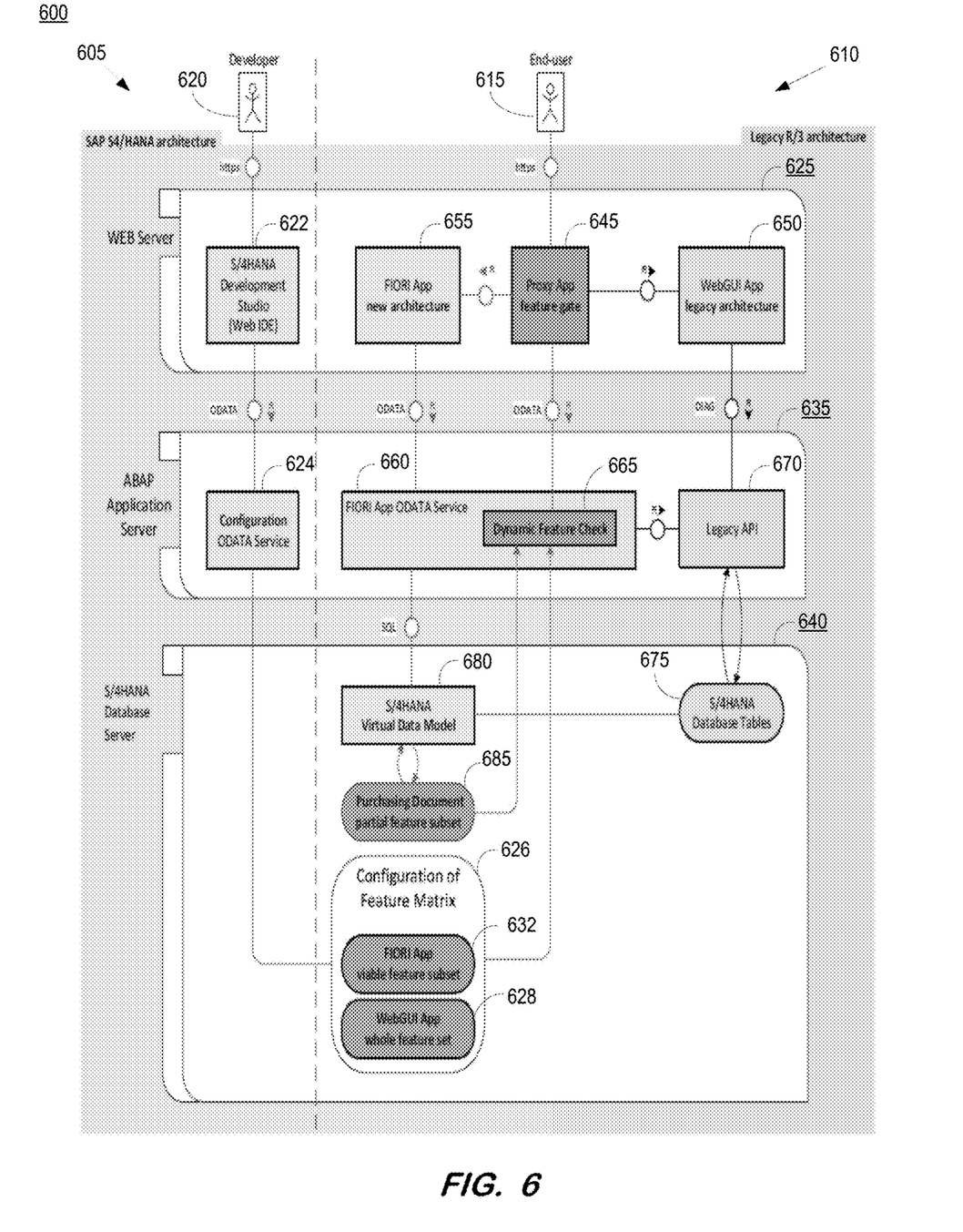
FIG. 6 is another illustrative depiction of a system to support a process, in accordance with some embodiments herein.

FIG. 6 is an illustrative depiction of a system or platform 600 to support processes and systems herein. In some aspects, FIG. 5 can be an extension of the platform of FIG. 5. System 600 generally includes a UI layer 625 (e.g., a WEB server) that can receive user input from an end-user 615 and a developer 605, a server layer 635 to receive requests from the UI layer and perform processing tasks including those of a DFC mechanim(s) herein, and a database layer 640 to perform database management tasks, including data persistence.

In accordance with some of the other aspects discussed herein, UI layer includes UI components 650 and 655 associated with a first (i.e., legacy) application and a second (e.g., new cloud-based) application, respectively. Additionally, UI layer 625 includes a module 6445 (e.g., a "proxy app feature gate") that may act as a gateway or controller to coordinate requests received from end-user 615 via either of the UIs 650 and 655.

Module 645 may forward or send the requests to process a BO as selected by end-user 615 via UI layer 625 to an application server of server layer 635. The application server may receive requests to process the BO from the UI layer in the form of OData, in some embodiments. The application server may operate to execute at least a portion of the processes disclosed herein, including but not limited to process 400 of FIG. 4. In support of the processing by the application server of server layer 635, database layer 640 may store and manage a feature matrix associated with the first application/architecture 628, a feature matrix associated with the second application/architecture 632, and a feature matrix 685 associated with the BOs that can be called by the first and second applications/architectures.

FIG. 6 further illustrates legacy APIs (Application Programming Interfaces) 670 that can be used to execute processing of a selected BO when it is determined by the DFC mechanisms of FIG. 6 that the second application does not support all of the features associated with a selected BO. In some embodiments, legacy APIs can be used by the first application/architecture, thereby limiting a need to modify the first application/architecture while introducing or migrating to a different or new second application/architecture. The legacy APIs may be used to facilitate communication between the different layers of platform 600, including the legacy database tables 675.

FIG. 6 also illustrates components for a developer 620 to interact with system 600 via developer UI component 622 to specify configuration details 624 of, for example, the feature sets of the first and second applications/architectures. The configuration specification or details may be used to establish the feature matrix associated with the first application/architecture 628 and the feature matrix associated with the second application/architecture 632. The feature matrix 685 associated with the BOs may be defined and established during a design-time related to the BOs.

Figure 7:
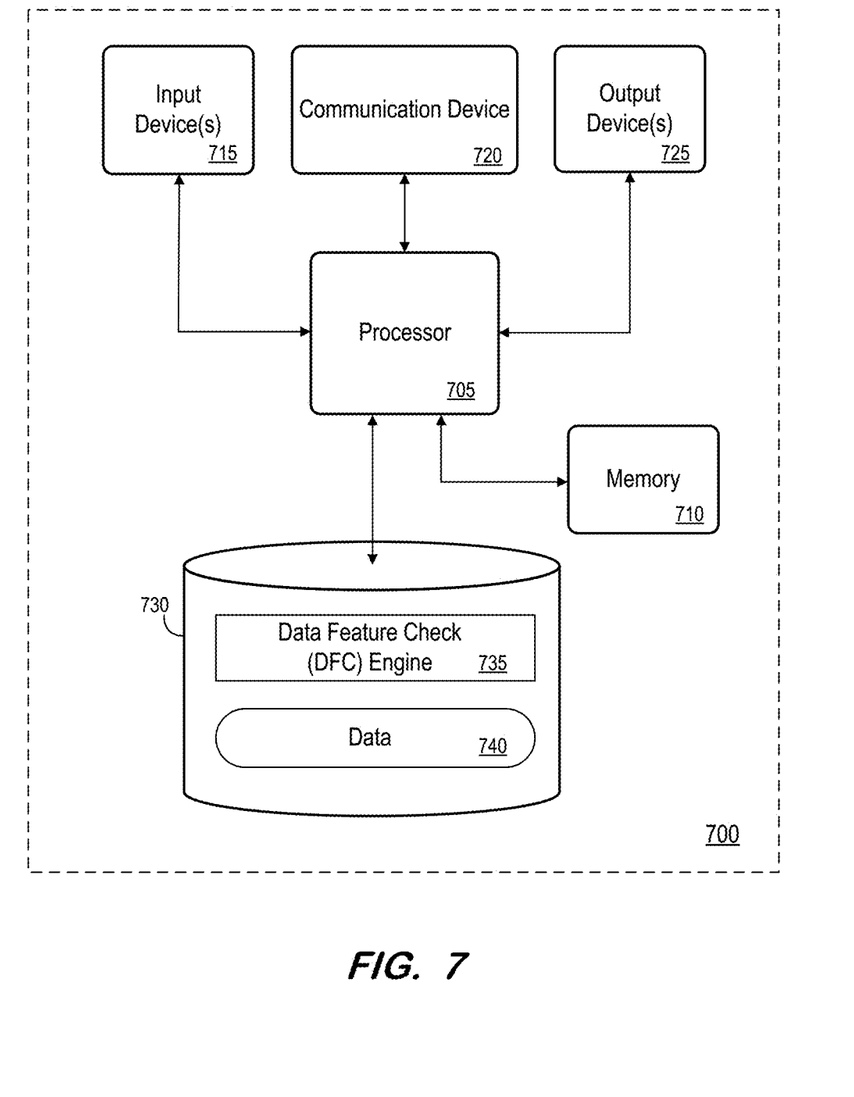
FIG. 7 is a schematic block diagram of a system according to some embodiments.

FIG. 7 is a block diagram of a system or apparatus 700 according to some embodiments. System 700 may be, for example, associated with devices for implementing a platform and or processes disclosed herein. System 700 comprises a processor 705, such as one or more commercially available Central Processing Units (CPUs) in the form of one-chip microprocessors or a multi-core processor, coupled to a communication device 720 configured to communicate via a communication network (not shown in FIG. 7) to another device or system. In the instance system 700 comprises a device or system, communication device 720 may provide a mechanism for system 700 to interface with an entity (e.g., an application, device, system, or service). System 700 may also include a cache 710, such as RAM memory modules. The system may further include an input device 715 (e.g., a touchscreen, mouse and/or keyboard to enter content) and an output device 725 (e.g., a touchscreen, a computer monitor to display, a LCD display).

Processor 705 communicates with a storage device 730. Storage device 730 may comprise any appropriate information storage device, including combinations of magnetic storage devices (e.g., a hard disk drive), optical storage devices, solid state drives, and/or semiconductor memory devices. In some embodiments, storage device 730 may comprise a cache management engine, including in some configurations an in-memory database.

Storage device 730 may store program code or instructions 735 that may provide processor executable instructions for analyzing the features associated with applications/architectures and BOs, in accordance with processes herein. Processor 705 may perform the instructions of the program instructions for Data Feature Check engine 735 to thereby operate in accordance with any of the embodiments described herein. Program instructions 735 may be stored in a compressed, uncompiled and/or encrypted format. Program instructions for Data Feature Check engine 735 may furthermore include other program elements, such as an operating system, a database management system, and/or device drivers used by the processor 705 to interface with, for example, other systems, devices, and peripheral devices (not shown in FIG. 7). Storage device 730 may also include data 740. Data 740 may be used by system 700, in some aspects, in performing one or more of the processes herein, including individual processes, individual operations of those processes, and combinations of the individual processes and the individual process operations.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Aspects of the processes, systems, and services discussed hereinabove may be implemented through any tangible implementation of one or more of tangible software, firmware, hardware, and combinations thereof, including processor executable instructions embodied on one or more types of media and executable by apparatuses including processors.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations.

What is claimed is:

1. A method comprising:
    receiving a request to process a data structure, the data structure including a first indication of a first set of features associated with the data structure that are capable of being invoked during the processing of the data structure, wherein the data structure has one or more fields with one or more associated attributes, wherein the first set of features comprises one or more tables, fields, or headers;
    determining the first set of features associated with the data structure based on the first indication;
    automatically determining, by a server, whether each feature of the first set of features associated with the data structure is capable of being executed by a cloud-based application based on a second indication of a second set of features supported by the cloud-based application;
    automatically processing the data structure, by the cloud-based application, directly in response to the determination by the server that each feature of the first set of features associated with the data structure is capable of being executed by the cloud-based application; and
    automatically processing the data structure, by a legacy application which supports the first set of features, directly in response to a determination by the server that each feature of the first set of features associated with the data structure is not supported by the cloud-based application, wherein the cloud-based application comprises one or more enhancements to functionality of the legacy application.

2. The method of claim 1, wherein the data structure includes attributes and metadata defining the first set of features associated with the data structure.

3. The method of claim 2, wherein the metadata includes the indication of the first set of features associated with the data structure.

4. The method of claim 1, wherein the second set of features supported by the legacy application is a subset of the first set of features supported by the cloud-based application.

5. The method of claim 1, wherein the cloud-based application comprises a first software architecture, the legacy application comprises a second software architecture, and the first and second software architectures comprise different sets of features.

6. The method of claim 1, wherein the determining of whether the at least one feature associated with the data structure is capable of being executed by the legacy application is automatically performed in reply to the request to process the data structure.

7. The method of claim 1, further comprising:
    defining the first set of features supported by the cloud-based application;
    defining the second set of features supported by the legacy application; and
    storing a record of the first set of features supported by the cloud-based application and the second set of features supported by the legacy application, the record to be used in the determining of whether the at least one feature associated with the data structure is capable of being executed by the legacy application.

8. A non-transitory computer-readable medium having processor-executable instructions stored thereon, the medium comprising:
    instructions to receiving a request to process a data structure, the data structure including an indication of a first set of features associated with the data structure that are capable of being invoked during the processing of the data structure, wherein the data structure has one or more fields with one or more associated attributes, wherein the first set of features comprises one or more tables, fields, or headers;
    instructions to determine the first set of features associated with the data structure based on the first indication;
    instructions to automatically determine by a server whether each feature of the first set of features associated with the data structure is capable of being executed by a cloud-based application based on a second indication of a second set of features supported by the cloud-based application;
    instructions to process the data structure, by the cloud-based application, in response to the determination by the server that each feature of the first set of features associated with the data structure is capable of being executed by the cloud-based application; and
    instructions to process the data structure, by a legacy application which supports the first set of features, in response to a determination by the server that each feature of the first set of features associated with the data structure is not supported by the cloud-based application, wherein the cloud-based application comprises one or more enhancements to functionality of the legacy application.

9. The medium of claim 8, wherein the data structure includes attributes and metadata defining the a first set of features associated with the data structure.

10. The medium of claim 9, wherein the metadata includes the indication of the a first set of features associated with the data structure.

11. The medium of claim 8, wherein the set of features supported by the legacy application is a subset of the features supported by the cloud-based application.

12. The medium of claim 8, wherein the cloud-based application comprises a first software architecture, the legacy application comprises a second software architecture, and the first and second software architectures comprise different sets of features.

13. The medium of claim 8, wherein the determining of whether the a first set of features associated with the data structure is capable of being executed by the legacy application is automatically performed in reply to the request to process the data structure.

14. The medium of claim 8, further comprising:
instructions to define the first set of features supported by the cloud-based application;
instructions to define the second set of features supported by the legacy application; and
instructions to store a record of the first set of features supported by the cloud-based application and the second set of features supported by the legacy application, the record to be used in the determining of whether the at least one feature associated with the data structure is capable of being executed by the legacy application.

15. A computing system comprising:
a cloud-based application;
a legacy application;
a memory storing processor-executable instructions; and
a processor to execute the processor-executable instructions in order to cause the computing system to:
process a received request to process a data structure, the data structure including a first indication of a first set of features associated with the data structure that are capable of being invoked during the processing of the data structure, wherein the data structure has one or more fields with one or more associated attributes, wherein the first set of features comprises one or more tables, fields, or headers;
determine the first set of features associated with the data structure based on the first indication;
automatically determine by a server whether each feature of the first set of features associated with the data structure is capable of being executed by a cloud-based application based on a second indication of a second set of features supported by the cloud-based application;
process the data structure, by the cloud-based application, in response to the determination by the server that each feature of the first set of features associated with the data structure is capable of being executed by the cloud-based application; and
process the data structure, by a legacy application which supports the first set of features, in response to a determination by the server that each feature of the first set of features associated with the data structure is not supported by the cloud-based application, wherein the cloud-based application comprises one or more enhancements to functionality of the legacy application.

16. The system of claim 15, wherein the data structure includes attributes and metadata defining the first set of features associated with the data structure.

17. The system of claim 15, wherein the set of features supported by the legacy application is a subset of the first set of features supported by the cloud-based application.

18. The system of claim 15, wherein the cloud-based application comprises a first software architecture, the legacy application comprises a second software architecture, and the first and second software architectures comprise different sets of features.

19. The system of claim 15, wherein the determining of whether the first set of features associated with the data structure is capable of being executed by the legacy application is automatically performed in reply to the request to process the data structure.

20. The system of claim 15, further comprising:
defining the first set of features supported by the cloud-based application;
defining the second set of features supported by the legacy application; and
storing a record of the first set of features supported by the cloud-based application and the second set of features supported by the legacy application, the record to be used in the determining of whether the at least one feature associated with the data structure is capable of being executed by the legacy application.

* * * * *